Figure 1:
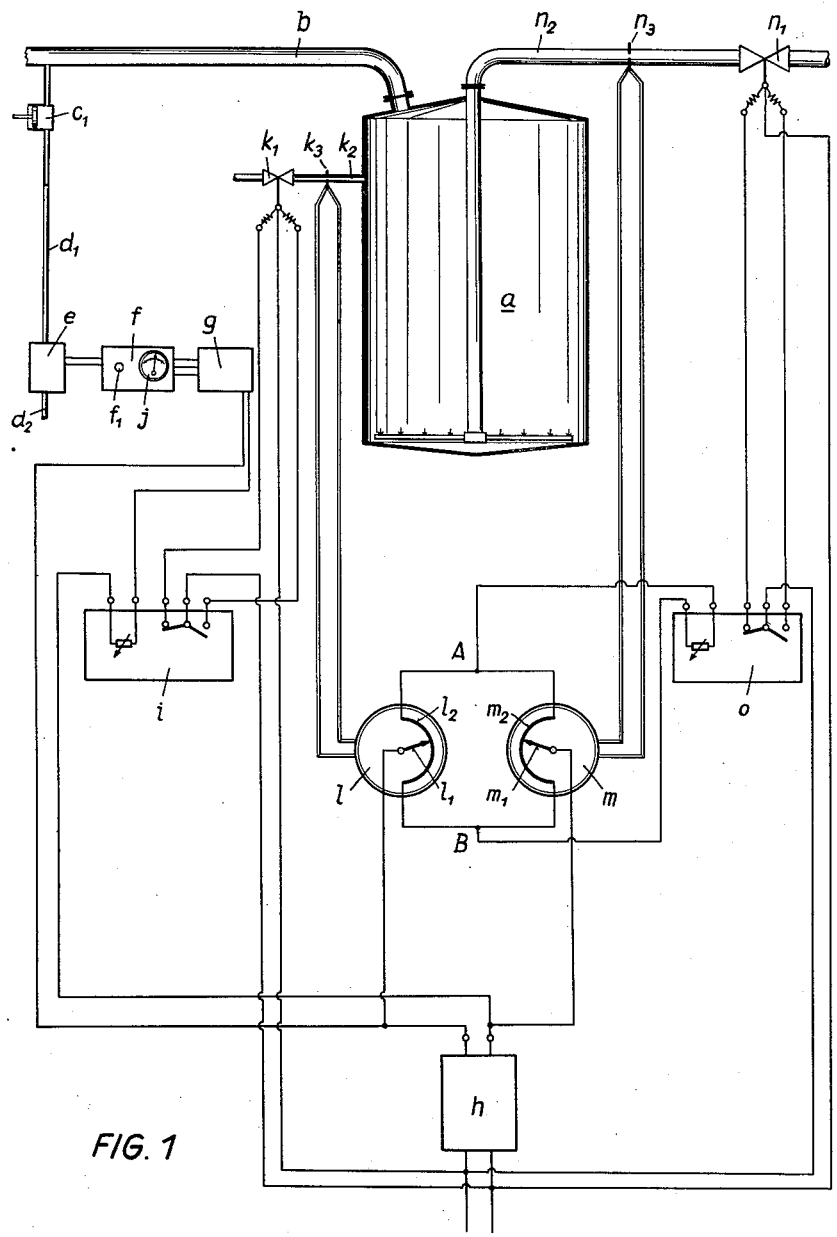

United States Patent Office

3,010,881
Patented Nov. 28, 1961

3,010,881
METHOD AND APPARATUS FOR CONTROLLING
THE GROWTH OF MICROBIAL CULTURES
Gustav Mautner Markhof, Vienna-Schwechat, Austria,
assignor to Patentauswertung Vogelbusch Gesellschaft
m.b.H., Vienna, Austria, a company of Austria
Filed Dec. 1, 1960, Ser. No. 72,938
Claims priority, application Austria Dec. 14, 1959
10 Claims. (Cl. 195—117)

This invention relates to a method and apparatus for controlling the growth of aerobic microbial cultures producing a volatile substance, and more particularly to a method and apparatus for controlling the supply of nutrient solution and air during growth of yeast in aerated mashes for producing baker's yeast and the like, in which alcohol is produced by fermentation.

In its more specific aspects, this invention is concerned with an improvement of the invention disclosed and claimed in the co-pending and commonly assigned application of Karl Rungaldier et al., Ser. No. 851,733, filed on November 9, 1959. As disclosed and claimed in that application, the air of respiration passed through a yeast culture is saturated with moisture and entrains a portion of the alcohol produced. The concentration of alcohol in the exhaust gases accurately reflects the alcohol concentration of the mash, and the ratio of alcohol to water in the exhaust gases is approximately twelve times the ratio in the mash under the usual conditions of industrial yeast production.

The quantitative relationship between alcohol and water vapor is independent of the specific method of mash aeration employed, of the mash level in the vat, and of other variables encountered in commercial operation. The water content of the saturated vapors exhausted is a function of vat temperature only. Since the fermentation temperature is normally held constant, the concentration of water vapor in the exhaust gases is constant, and the alcohol concentration in the waste gases is proportional to the alcohol content of the mash. A signal derived from the alcohol content of the exhaust gases may thus be employed to automatically control the flow of respiration air, nutrient solution or both to the growing culture in such a manner as to maintain the alcohol concentration of the mash at a desired optimum value.

It is the principal object of this invention to provide a simple and sensitive method of controlling the air and nutrient flow responsive to the alcohol content of the exhaust gases, and apparatus for performing the method.

More specifically, the invention aims at translating the alcohol concentration of the exhaust gases into a temperature change which can be readily sensed by known thermo-electric devices to generate pulses capable of automatically controlling flow of nutrient and air.

Another object of the invention is the provision of apparatus for sensing the alcohol concentration in the exhaust gases which does not require chemicals or other operating materials which are consumed during the operation of the apparatus, and thus have to be replaced from time to time. The apparatus of the invention is capable of almost unlimited unattended operation.

The invention is based on the discovery that the alcohol vapors in the exhaust gases may be oxidized with the residual oxygen of the air of respiration, and that the heat of combustion generated is proportional to the amount of alcohol oxidized. At a constant rate of exhaust gas flow, the temperature change of the gas is proportional to its alcohol concentration.

Preferably the exhaust gases are passed through a combustion chamber to which heat is supplied at a constant rate. In the absence of a chemical reaction in the exhaust, the gas passing at a constant rate is heated to a constant temperature. This temperature is held high enough to ensure complete combustion of the alcohol vapors in the amply available excess oxygen during passage through the chamber, and the alcohol content of the mash will then be indicated by the temperature rise of the exhaust gases through the combustion chamber. A signal for control of nutrient and air flow to the fermentation vat may be derived from the temperature change.

Figure 2:
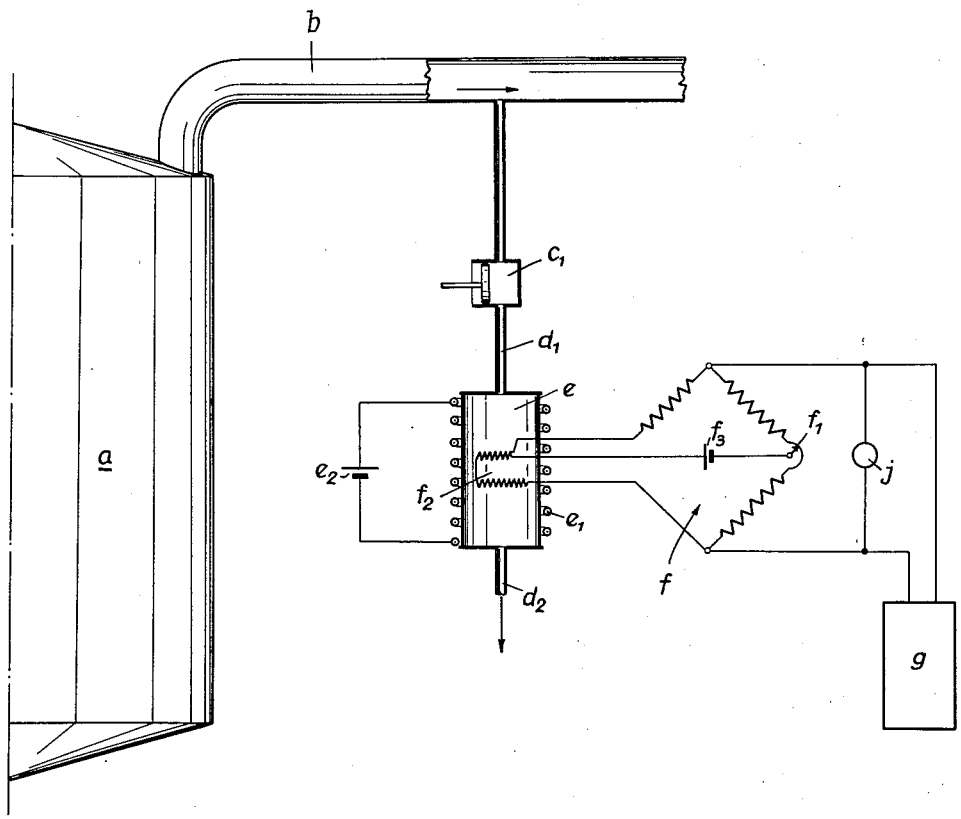

Other features of this invention and many of the attendant advantages thereof will become apparent to those skilled in the art from the detailed description of a preferred embodiment of the apparatus of the invention with reference to the annexed drawings in which:

FIG. 1 diagrammatically illustrates a fermentation plant equipped with the control apparatus of the invention; and FIG. 2 is a digram of a detail of the apparatus of FIG. 1.

Referring initially to FIG. 1, there is seen a fermentation vat $a$ provided with an exhaust pipe $b$ from which a gas sample is drawn by a metering pump $c_1$ and is conducted through a pipe $d_1$ into a combustion chamber $e$. The products of combustion together with unreacted excess air are discharged through a pipe $d_2$.

An electrical temperature sensing device in the combustion chamber, not visible in FIG. 1, is wired to an indicating control instrument $f$ equipped with a galvanometer $j$ the scale of which is directly calibrated in units of alcohol content of mash. The output of the instrument $f$ is fed to an amplifier $g$ and may be modified for a desired alcohol content in the vat $a$ by a potentiometer $f_1$ in a manner that will become apparent hereinafter.

The output of the amplifier $g$ is arranged in circuit with a source of constant voltage $h$ and actuates a hoop drop controller $i$ the position of which thus is representative of the temperature prevailing in the combustion chamber $e$. The controller $i$ which is capable of assuming three positions is sensed periodically. If it is in the position corresponding to the desired combustion chamber temperature, and thus to the desired alcohol content of the mash, no pulse is transmitted by a detecting feeler to the motor valve $k_1$ which throttles flow of molasses nutrient to the vat $a$ through the supply line $k_2$. If the controller $i$ is not in the desired position, an opening or closing pulse is generated each time the controller is sensed until the composition of the mash is restored to the desired alcohol concentration, and this concentration is reflected in the temperature of the combustion chamber.

The arrangement described above controls the supply of nutrient solution in such a manner that a constant alcohol concentration is maintained in the fermentation vat $a$. The supply of nutrient is thereby also held proportional to the increase in the amount of yeast in the vat.

For well known reasons, it is preferred to adjust the air supply in proportion to the yeast growth, and thus in proportion to the flow of nutrient material.

The flow rate of the molasses in the supply line $k_2$ is sensed by a flow meter comprising a constriction $k_3$ in the line $k_2$ and a ring balance $l$ communicating with the line $k_2$ upstream and downstream of the constriction $k_3$. The flow rate sensed by the ring balance is indicated by a pointer $l_1$ which is coupled to a potentiometer $l_2$. The potentiometer $l_2$ is arranged in a Wheatstone bridge circuit with the potentiometer $m_2$. The bridge circuit is energized by the constant voltage source $h$. The resistance of the potentiometer $m_2$ is proportional to the position of the pointer $m_1$ of the ring balance $m$ which measures the amount of flow passing through the air supply line $n_2$ past a constriction $n_3$ to the fermentation vat $a$. The constrictions $k_3$, $n_3$ and the ring balances $l$, $m$ are dimensioned in such a manner that proportional rates of flow of air and nutrient solution result in proportional values of resistance in the potentiometers $l_2$ and $m_2$. When the controller $i$ changes the position of the nutrient valve $k_1$, the pointer $l_1$ of the ring balance $l$ will change its position corresponding to the change in molasses flow rate. A potential is generated between the terminals A and B of the Wheatstone bridge circuit and the hoop drop controller $o$ is moved from its neutral position. The hoop drop controller $o$ operates in the same manner as controller $i$. It is periodically sensed, and its displacement causes a controlling pulse to be transmitted to the motor valve $n_1$ in the air line $n_2$. These pulses are repeated periodically during each sensing of the controller $o$ until the terminals A and B are at the same potential, that is, until proportionality of molasses and air flow has been restored.

FIG. 2 shows the source of the electrical control signal in the apparatus of FIG. 1 in somewhat more detail. The fermentation plant proper, the supply lines leading to the vat $a$ and the control circuit have been largely omitted for the sake of clarity. The metering pump $c_1$ draws an exhaust gas sample from the exhaust pipe $b$ at a continuous constant rate into the combustion chamber $e$ equipped with a heating coil $e_1$ of electrical resistance wire energized by a adjustable source $e_2$ of constant wattage current. When the exhaust gas sample drawn by the pump $c_1$ does not contain a substance capable of reacting with the excess air, the temperature in the combustion chamber is constant. The source $e_2$ is adjusted in such a manner that the temperature in the combustion chamber is higher than the ignition temperature of the alcohol, say 700° C.

When alcohol bearing exhaust gas enters the combustion chamber, the alcohol reacts with the excess oxygen and the temperature in the combustion chamber rises above the normal value. A resistance thermometer $f_2$ is arranged in the chamber in a Wheatstone bridge circuit with the indicating control instrument $f$. The bridge circuit is equipped with its own electric power source $f_3$ and includes the potentiometer $f_1$ arranged for varying the zero output of the control instrument relative to the input supplied by the resistance thermometer $f_2$. The instrument $f$ may thus be set for zero output by the potentiometer $f_1$ for any desired temperature in the combustion chamber $a$, and thereby for any desired alcohol concentration in the vat $a$. The output of the bridge circuit may be read from the galvanometer $j$, and it is also fed to the amplifier $g$ for actuating the flow controls for the vat $a$ in the manner described above.

If so desired, the operating temperature of the combustion chamber $e$ may be lowered by filling it at least in part with one of the known catalysts effective in reacting alcohol with oxygen, such as platinum metal catalysts or mixed oxide catalysts. A suitable catalyst of the latter type is being sold commercially under the trade name "Hopcalit."

It will be readily appreciated by those skilled in this art that the control arrangement employed may be modified in many ways without departing from the spirit and scope of this invention. Other well known devices may be employed to control the rate of flow of the nutrient solution, the air of aeration, or both according to the thermal effects sensed in the combustion chamber. Different apparatus may be employed to control flow of either the nutrient solution or the air of aeration in any desired proportional ratio to the flow of the other fluid. A thermoelectric couple may replace the resistance thermometer shown.

The mode of operation of the afore-described preferred embodiment of the apparatus of this invention will now be illustrated by specific numerical examples.

*Example 1*

The fermentation in the vat $a$ is performed at 30° C., and the exhaust gases are saturated at that temperature with water vapor. A sample is drawn by the pump $c_1$ at a constant rate of 2 liters per minute and reaches the combustion chamber without measurable change in temperature. The thermal energy supplied to the gas passing through the combustion chamber by the heating coil $e_1$ is 400 calories per minute and causes a normal temperature rise of the exhaust gases from 30° to 700° C. A temperature rise of 1° C. corresponds to an energy input of 0.597 calorie per minute.

The mash in the vat $a$ has an alcohol concentration of 0.065% and the exhaust gases entrain 0.2 mg. of ethanol in each liter. The rate of alcohol combustion in the chamber $e$ is thus 0.4 mg. per minute, and 2.933 calories are generated by the exothermic reaction, the heat of combustion of alcohol vapor being 7.332 calories per milligram. This additional thermal input raises the temperature of the exhaust gases by $$\frac{2.933}{0.597} = 4.9° \text{ C.}$$

The resistance thermometer arrangement has a sensitivity of 0.2% of full scale, or 1.4° C., corresponding to a variation in the alcohol content of the mash of 0.02%. This sensitivity determines the range within which the alcohol content of the mash in the vat $a$ may be controlled. The mid-point of this range may be set on the potentiometer $f_1$ and any deviation therefrom read from the galvanometer $j$. It is, of course, possible to set the potentiometer $f_1$ in such a manner that the galvanometer will directly read in percent alcohol in the mash, or to provide the galvanometer with an adjustable scale so that the galvanometer may be adjusted to read directly in percent alcohol for any setting of the potentiometer $f_1$.

Under otherwise similar conditions, the range of mash control is narrower when a catalyst-filled combustion chamber is employed. The catalyst reduces the necessary operating temperature of the combustion chamber very substantially, and thus permits the use of a resistance thermometer arrangement the absolute margin of error of which is concurrently reduced at equal relative precision, as will be readily evident from the following example.

*Example 2*

Conditions of fermentation and sampling are the same as in Example 1, with 2 liters of gas at 30° pumped through the combustion chamber and over the catalyst therein in each minute. 87.13 calories per minute are furnished by the heating coil $e_1$ and raise the temperature of the exhaust gas from 30 to 180° C. A temperature rise of 1° C. thus corresponds to an energy input of 0.581 calorie per minute.

The mash again has an alcohol content of 0.065% by volume and releases 0.2 mg. of alcohol to each liter of passing gas. The combustion of 0.4 mg. of alcohol supplies additional thermal energy at the rate of 2.933 calories per minute to the waste gases and raises their temperature by $$\frac{2.933}{0.581} = 5.05° \text{ C.}$$

The resistance thermometer arrangement again has a sensitivity of 0.2% of full scale which for the lower temperature range involved corresponds to 0.36° C. or a variation in the alcohol content of the mash of 0.005%.

It is evident that the precision of control may further be enhanced by the use of temperature sensing devices and associated circuit elements of greater accuracy, but the relatively inexpensive instruments described, in the specific examples have been found to provide a measure of control amply sufficient for industrial purposes.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed and desired to be protected by Letters Patent of the United States is:

1. In a method of controlling the aerobic growth of a yeast culture producing alcohol from a nutrient material, the alcohol being volatile with air, the steps comprising passing respiration supporting air through said culture, whereby a portion of the alcohol produced thereby is entrained by said air; passing a portion of said air entraining alcohol from said yeast culture through a reaction zone; reacting said alcohol in said zone with oxygen contained in said air; sensing the temperature change produced by the reaction; translating said temperature change into an electrical signal; and controlling flow of neutrient material to said culture responsive to said electrical signal.

2. In an method of controlling the aerobic growth of a yeast culture producing alcohol from a neutrient material, the alcohol being volatile with air, the steps comprising passing respiration supporting air through said culture, whereby a portion of the alcohol produced thereby is entrained by said air; continuously passing a portion of said air entraining alcohol from said yeast culture through a reaction zone at a uniform rate; reacting said alcohol in said zone with oxygen contained in said air; sensing the temperature change produced by the reaction; translating said temperature change into an electrical signal; and controlling flow of nutrient material to said culture responsive to said electrical signal.

3. In a method of controlling the aerobic growth of a yeast culture producing alcohol from a nutrient material, the alcohol being volatile with air, the steps comprising passing respiration supporting air through said culture, whereby a portion of the alcohol produced thereby is entrained by said air; passing a portion of said air entraining alcohol from said yeast culture through a reaction zone; reacting said alcohol in said zone with oxygen contained in said air; sensing the temperature change produced by the reaction; translating said temperature change into an electrical signal; and controlling flow of nutrient material and air to said culture responsive to said electrical signal.

4. In a method of controlling the aerobic growth of a yeast culture producing alcohol from a nutrient material, the alcohol being volatile with air, the steps comprising passing respiration supporting air through said culture, whereby a portion of the alcohol produced thereby is entrained by said air; continuously passing a portion of said air entraining alcohol from said yeast culture through a reaction zone at a uniform rate; supplying heat to said reaction zone at a rate sufficient to maintain said zone at a constant temperature when said air entrains no alcohol; reacting said alcohol in said zone with oxygen contained in said air; sensing the temperature change produced by the reaction; translating said temperature change into an electrical signal quantitatively related to the magnitude of said temperature change; and controlling flow of nutrient material to said culture responsive to said electrical signal.

5. In a method of controlling the aerobic growth of a yeast culture producing alcohol from a nutrient material, the alcohol being volatile with air, the steps comprising passing respiration supporting air through said culture, whereby a portion of the alcohol produced thereby is entrained by said air; passing a portion of said air entraining alcohol from said yeast culture through a reaction zone in the presence of an oxidation catalyst; reacting said alcohol in said zone with oxygen contained in said air; sensing the temperature change produced by the reaction; translating said temperature change into an electrical signal; and controlling flow of nutrient material to said culture responsive to said electrical signal.

6. In a method of controlling the aerobic growth of a yeast culture producing alcohol from a nutrient material, the alcohol being volatile with air, the steps comprising passing respiration supporting air through said culture, whereby a portion of the alcohol produced thereby is entrained by said air; continuously passing a portion of said air entraining alcohol from said yeast culture through a reaction zone at a uniform rate; supplying heat said air entrains no alcohol; reacting said alcohol in said zone at a constant temperature higher than the ignition temperature of said alcohol entrained in said air when said ar entrains no alcohol; reacting said alcohol in said zone with oxygen contained in said air; sensing the temperature change produced by the reaction; translating said temperature change into an electrical signal quantitatively related to the magnitude of said temperature change; and controlling flow of nutrient material to said culture responsive to said electrical signal.

7. In an arrangement for controlled growth of an aerobic microbial culture producing a combustible substance volatile with the gaseous material supporting respiration of the culture, in combination, a container adapted to hold a microbial culture; first conduit means communicating with said container for supplying nutrient material to said culture; second conduit means communicating with said container for passing a supply of a respiration and oxidation supporting gaseous material through said culture; exhaust means on said container for withdrawing said gaseous material from said culture after passage through the same; a combustion chamber communicating with said exhaust means for combustion of a combustible volatile substance entrained by passage of said gaseous material through said culture; temperature sensing means mounted on said chamber for sensing a temperature change caused by said combustion and generating an electrical temperature signal; electrical control means in circuit with said sensing means in at least one of said conduit means and responsive to said signal for controlling the rate of flow of at least one of said materials through the respective conduit means.

8. In an arrangement as set forth in claim 7, said volatile substance being alcohol, and said gaseous material being air.

9. In an arrangement as set forth in claim 7, heating means for heating said combustion chamber to a temperature higher than the ignition temperature of said volatile substance in said gaseous material.

10. In an arrangement as set forth in claim 7, catalyst means in said combustion chamber for initiating combustion of said volatile substance with said gaseous material.

No references cited.